July 19, 1927.
W. F. BROWN
SIPHON DEVICE
Filed Oct. 4 1926
1,636,123
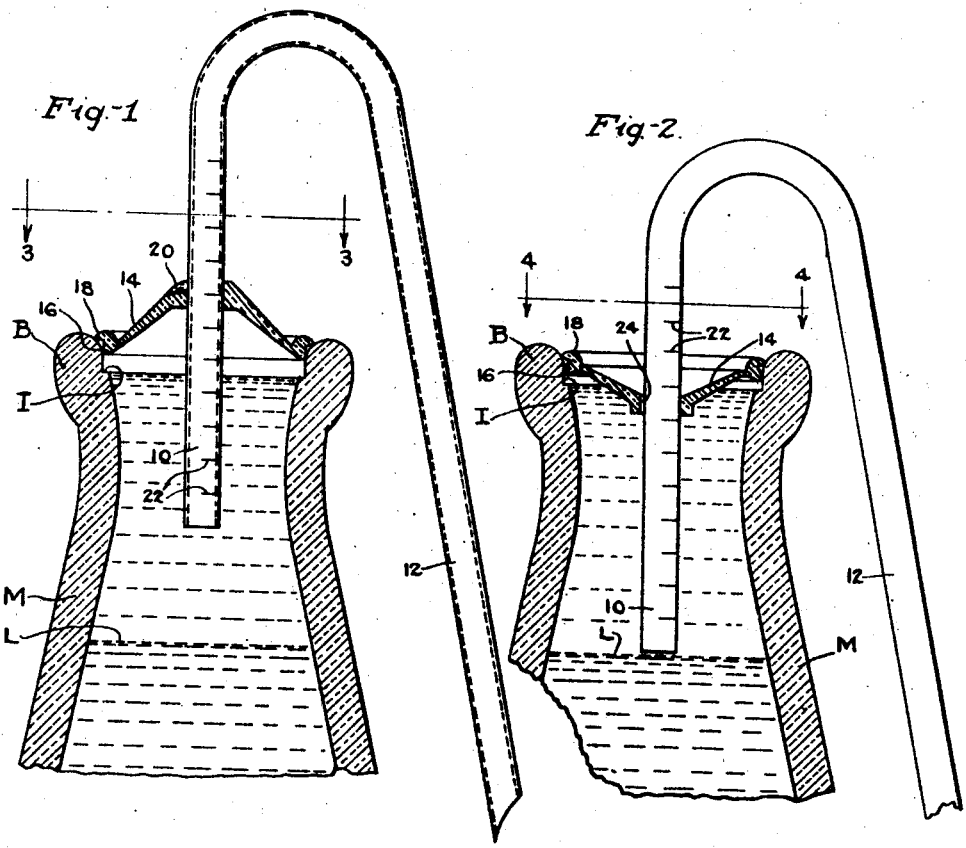
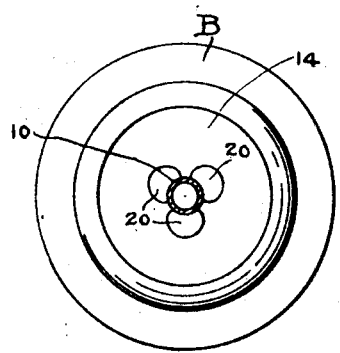
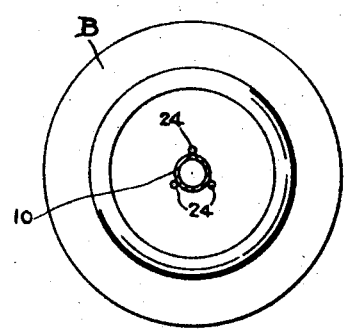
Inventor:
Walter F. Brown.
By Whiteley and Ruckman
Attorneys.

Patented July 19, 1927.

1,636,123

UNITED STATES PATENT OFFICE.

WALTER F. BROWN, OF MINNEAPOLIS, MINNESOTA, ASSIGNOR OF ONE-HALF TO ANTOINE A. LAURENT, OF MINNEAPOLIS, MINNESOTA.

SIPHON DEVICE.

Application filed October 4, 1926. Serial No. 139,391.

My invention relates to siphon devices and an object is to provide a device of this character consisting of a siphon tube whose short leg passes through an opening in a flexible diaphragm adapted to rest upon the mouth of a container, the upper side of the diaphragm being recessed adjacent said opening so as to provide an air vent when the diaphragm is depressed to start the siphoning action.

The full objects and advantages of my invention will appear in connection with the detailed description thereof, and the novel features of my inventive idea will be particularly pointed out in the claims.

In the accompanying drawings, which illustrate a practical embodiment of my invention,—

Fig. 1 is a fragmentary vertical section of a milk bottle having a siphon device associated therewith and showing the diaphragm portion thereof in position before it is depressed. Fig. 2 is a similar view showing the position assumed by the diaphragm after it has been depressed. Fig. 3 is a view in section on the line 3—3 of Fig. 1. Fig. 4 is a view in section on the line 4—4 of Fig. 2.

The drawings show my invention used in connection with a milk bottle M, at the upper end of which is a bead B and an internal shoulder I on which the ordinary closure is adapted to rest. The cream at the top of the bottle ordinarily extends down to about the position of the line L. In carrying out my invention I provide a siphoning tube having a short leg 10 and a long leg 12. I also provide a flexible diaphragm 14 which may be made of rubber. This diaphragm is upwardly bulged, preferably of concavo-convex form, and has a thickened margin 16 provided with a circumferential flange 18. The diaphragm has a central opening the wall of which engages the short leg 10 in air-tight manner when the device is in the position shown in Fig. 1. The material around the central opening is preferably thickened as shown. The upper side of the diaphragm adjacent the central openings is recessed, being provided with one or more recesses 20 which do not extend quite through the diaphragm when the latter is in its normal position. In the embodiment shown there are three of the recesses 20 and these recesses are preferably conical in shape with the point downward. The leg 10 may be provided with graduations 22 to indicate the position of the diaphragm on the tube according to how much of the upper layer of the contents of the container is to be siphoned.

The operation and advantages of my invention will be readily understood in connection with the foregoing description. The diaphragm with the short leg of the tube inserted therethrough is placed upon the mouth of the container as shown in Fig. 1 with the periphery of the diaphragm in substantially air-tight engagement with the mouth or opening of the container. The diaphragm is then depressed into the position shown in Fig. 2, which causes pressure to be exerted on the contents of the container and thereby force sufficient liquid up the short arm to start the siphoning action. When the diaphragm is being depressed into reverse position the wall of the central opening has somewhat of a rolling action on the tube and the walls of the recesses at their upper portion are partly squeezed together, while at their lower portion they open up so that air vents 24 are produced which permit the siphoning action to continue until the liquid falls to the lower end of the short leg 10. On account of the weakening of the upper portion of the diaphragm around the central opening, due to the recesses 20, the diaphragm when pressed downwardly at its middle readily moves into the reverse position shown in Figs. 2 and 4.

I claim:

1. A siphon device comprising a flexible diaphragm whose margin is adapted to engage the mouth of a container, said diaphragm having a central opening, and a siphon tube whose short leg passes through said opening, the upper side of said diaphragm adjacent said opening being recessed to constitute an air vent when said diaphragm is depressed.

2. A siphon device comprising a flexible diaphragm normally bulged upwardly and whose margin is adapted to engage the mouth of a container, said diaphragm having a central opening, and a siphon tube whose short leg passes through said opening, the upper side of said diaphragm adjacent said opening being recessed to constitute an air vent when said diaphragm is depressed.

3. A siphon device comprising a flexible diaphragm normally bulged upwardly and whose margin is adapted to engage the mouth of a container, said diaphragm having a central opening, and a siphon tube whose short leg passes through said opening, the upper side of said diaphragm adjacent said opening containing a plurality of recesses which permit said diaphragm to turn into reverse position when centrally depressed and which then constitute air vents.

In testimony whereof I hereunto affix my signature.

WALTER F. BROWN.